United States Patent
Akutsu et al.

(10) Patent No.: US 12,320,727 B2
(45) Date of Patent: Jun. 3, 2025

(54) VEHICLE VIBRATION METHOD AND VEHICLE VIBRATION DEVICE

(71) Applicant: HONDA MOTOR CO., LTD., Tokyo (JP)

(72) Inventors: Susumu Akutsu, Tokyo (JP); Shutaro Hiramoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 282 days.

(21) Appl. No.: 17/820,567

(22) Filed: Aug. 18, 2022

(65) Prior Publication Data
US 2023/0057022 A1 Feb. 23, 2023

(30) Foreign Application Priority Data
Aug. 20, 2021 (JP) ................... 2021-135215

(51) Int. Cl.
*G01M 17/007* (2006.01)
*G01M 7/00* (2006.01)

(52) U.S. Cl.
CPC .......... *G01M 17/0078* (2013.01); *G01M 7/00* (2013.01); *G01M 17/0072* (2013.01); *G01M 17/0074* (2013.01)

(58) Field of Classification Search
CPC ............... G01M 17/0078; G01M 7/00; G01M 17/0072; G01M 17/0074
See application file for complete search history.

(56) References Cited

U.S. PATENT DOCUMENTS

| 3,914,990 A * | 10/1975 | Borg ................... G01M 17/045 73/670 |
| 2008/0216621 A1 * | 9/2008 | Nijssen ..................... B23B 5/32 82/105 |
| 2010/0058851 A1 * | 3/2010 | Lawrence ............... G01L 5/282 73/123 |

(Continued)

FOREIGN PATENT DOCUMENTS

| JP | 2007147394 A * | 6/2007 |
| JP | 2017009545 A | 1/2017 |

(Continued)

OTHER PUBLICATIONS

JP-2007147394-A, English Translation (Year: 2007).*
WO-2022255237-A1, English Translation (Year: 2022).*

*Primary Examiner* — Ryan D Walsh
(74) *Attorney, Agent, or Firm* — CKC & Partners Co., LLC

(57) ABSTRACT

A vehicle vibration method suitable for performing a test simulating a rough road, the vehicle vibration method using a vibration device that causes at least one wheel of a test target vehicle, the method including: an initial height setting step including setting a shaft distance in the front-rear direction between a front shaft and a rear shaft to an initial setting distance and setting the wheel at an initial setting height; a vibration step including performing vibration by at least one selected from a raising operation step including narrowing the shaft distance from the initial setting distance to raise the wheel from the initial setting height, and a lowering operation step including widening the shaft distance from the initial setting distance to lower the wheel from the initial setting height; and a return step including setting back the shaft distance to the initial setting distance.

5 Claims, 9 Drawing Sheets

(56) References Cited

U.S. PATENT DOCUMENTS

| | | | | |
|---|---|---|---|---|
| 2021/0033496 A1* | 2/2021 | Akutsu | ............ | G01M 17/0074 |
| 2021/0215574 A1* | 7/2021 | Akutsu | ................ | G01M 7/027 |
| 2022/0065753 A1* | 3/2022 | Kamikura | ........... | G01M 17/065 |
| 2022/0402515 A1* | 12/2022 | Aono | .................. | B60W 60/001 |
| 2023/0054158 A1* | 2/2023 | Akutsu | ................... | G01M 7/00 |
| 2023/0114109 A1* | 4/2023 | Akutsu | ............. | G01M 17/0072 73/669 |

FOREIGN PATENT DOCUMENTS

| | | | | |
|---|---|---|---|---|
| WO | 2020218251 A1 | 10/2020 | | |
| WO | WO-2022255237 A1 * | 12/2022 | .......... | G01M 17/007 |

\* cited by examiner

VEHICLE VIBRATION METHOD AND VEHICLE VIBRATION DEVICE

This application is based on and claims the benefit of priority from Japanese Patent Application No. 2021-135215, filed on 20 Aug. 2021, the content of which is incorporated herein by reference.

BACKGROUND OF THE INVENTION

Field of the Invention

The present invention relates to a vehicle vibration method and a vehicle vibration device.

Related Art

Various vehicle vibration methods have been known which obtain various characteristic data relating to vibration of a test target vehicle. As an example, the following vehicle vibration method has been proposed. In this method, first, each wheel of a vehicle is sandwiched in the front-rear direction by a front shaft and a rear shaft both extending in the left-right direction. Then, by moving the front shaft back and forth in the horizontal direction, the wheel is caused to vibrate back and forth in the up-down direction. For example, refer to PCT International Publication No. WO2020/218251. In addition, the following vehicle vibration method has been also proposed. In this method, tires are caused to vibrate using rollers having unevenness to simulate vibrations during traveling (see, e.g., Japanese Unexamined Patent Application, Publication No. 2017-9545).

Patent Document 1: PCT International Publication No. WO2020/218251
Patent Document 2: Japanese Unexamined Patent Application, Publication No. 2017-9545

SUMMARY OF THE INVENTION

In addition, there are cases where a test for vehicle characteristics of sprung mass on a rough road is performed on a test target vehicle. However, the vehicle vibration methods disclosed in PCT International Publication No. WO2020/218251 or Japanese Unexamined Patent Application, Publication No. 2017-9545 do not allow the wheels to be lifted or sunk. Therefore, these vibration methods for vehicles are not suitable for tests simulating rough roads.

The present invention has been made in view of the above circumstances, and an object of the present invention is to provide a vehicle vibration method and a vehicle vibration device suitable for performing a test simulating vehicle characteristics of sprung mass on a rough road.

According to a first aspect of the present invention, a vehicle vibration method with a vibration device (for example, a vehicle vibration device 1 to be described later) that causes at least one wheel of a test target vehicle (for example, a vehicle 2 to be described later) to vibrate back and forth in an up-down direction by sandwiching the wheel by a front shaft (for example, a front shaft 7 to be described later) and a rear shaft (for example, a rear shaft 8 to be described later) extending in a left-right direction and causing at least one selected from the front shaft and the rear shaft (for example, the front shaft 7 to be described later) to move back and forth in a horizontal direction is provided which includes: an initial height setting step (for example, Step S71 to be described later) including setting a distance (for example, a shaft distance d to be described later) in the front-rear direction between the front shaft and the rear shaft to a predetermined initial setting distance (for example, an initial setting distance s to be described later) and setting the wheel at a predetermined initial setting height (for example, an initial setting height Hi to be described later); a vibration step (for example, Step S72 to be described later) including performing vibration by at least one selected from a raising operation step including narrowing the distance in the front-rear direction between the front shaft and the rear shaft from the initial setting distance to raise the wheel from the initial setting height, and a lowering operation step including widening the distance in the front-rear direction between the front shaft and the rear shaft from the initial setting distance to lower the wheel from the initial setting height; and a return step (for example, Step S73 to be described later) including setting back the distance in the front-rear direction between the front shaft and the rear shaft to the initial setting distance.

According to a second aspect of the present invention, a vehicle vibration method with a vibration device (for example, a vehicle vibration device 1 to be described later) that causes at least one wheel of a test target vehicle (for example, a vehicle 2 to be described later) to vibrate back and forth in an up-down direction by sandwiching the wheel by a front shaft (for example, a front shaft 7 to be described later) and a rear shaft (for example, a rear shaft 8 to be described later) extending in a left-right direction and causing at least one selected from the front shaft and the rear shaft (for example, the front shaft 7 to be described later) to move back and forth in a horizontal direction is provided which includes: an initial height setting step (for example, Step S81 to be described later) including setting a distance in the front-rear direction between the front shaft and the rear shaft to a predetermined initial setting distance and setting the wheel at a predetermined initial setting height; and a vibration step (for example, Step S84 to be described later: NO→Step S82→Step S83) including alternately repeating a raising operation step (for example, Step S82 to be described later) including narrowing the distance in the front-rear direction between the front shaft and the rear shaft from the initial setting distance to raise the wheel from the initial setting height, and a lowering operation step (for example, Step S83 to be described later) including widening the distance in the front-rear direction between the front shaft and the rear shaft from the initial setting distance to lower the wheel from the initial setting height.

According to a third aspect of the present invention, a vehicle vibration method with a vibration device (for example, a vehicle vibration device 1 to be described later) that causes each of a front wheel and a rear wheel of a test target vehicle (for example, a vehicle 2 to be described later) to vibrate back and forth in an up-down direction by sandwiching each of the front wheel and the rear wheel by a front shaft (for example, a front shaft 7 to be described later) and a rear shaft (for example, a rear shaft 8 to be described later) extending in a left-right direction and causing at least one selected from the front shaft and the rear shaft (for example, the front shaft 7 to be described later) to move back and forth in a horizontal direction is provided which includes: a front-rear wheel initial height setting step (for example, Step S91 to be described later) including setting a distance in the front-rear direction between the front shaft and the rear shaft to a predetermined initial setting distance and setting each of the front wheel and the rear wheel at a predetermined initial setting height; and a vibration step (for example, Step S94 to be described later: NO→Step S95→Step S92→Step S93) including alternately repeating a one-wheel raising operation step (for example, step S92 to be described later) including narrowing the distance in the front-rear direction between the front shaft and the rear shaft from the initial setting distance to raise one selected from the front wheel and the rear wheel from the initial setting height, and one other-wheel lowering operation step (for example, Step S93 to be described later) including widening the distance in the front-rear direction between the front shaft and the rear shaft from the initial setting distance to lower one selected from the front wheel and the rear wheel from the initial setting height.

According to a fourth aspect of the present invention, the vehicle vibration method as described in any one of the above first aspect to third aspect is provided, in which the vibration step is performed while causing the wheel to vibrate back and forth in the up-down direction by causing at least one selected from the front shaft and the rear shaft to move back and forth in the horizontal direction.

According to a fifth aspect of the present invention, a vehicle vibration device (for example, a vehicle vibration device 1 to be described later) that causes each of wheels of a test target vehicle (for example, a vehicle 2 to be described later) to vibrate back and forth in an up-down direction by sandwiching each of the wheels by a front shaft (for example, a front shaft 7 to be described later) and a rear shaft (for example, a rear shaft 8 to be described later) extending in a left-right direction and causing the front shaft to move back and forth in a horizontal direction is provided, the vehicle vibration device includes a moving structure (for example, a moving structure 10 to be described later) including an actuator (for example, an actuator 9 to be described later) that causes the front shaft to move back and forth in the horizontal direction, and the moving structure is configured to operate under control of a predetermined controller (for example, a control unit 11 to be described later) and cause the front shaft to move, in which the controller is configured to cause the moving structure to perform:

- an initial height setting operation (for example, an operation to perform Step S71 to be described later) including setting a distance in the front-rear direction between the front shaft and the rear shaft to a predetermined initial setting distance and setting the wheel at a predetermined initial setting height; a vibration operation (for example, an operation to perform Step S72 to be described later) including performing vibration by at least one selected from a raising operation including narrowing the distance in the front-rear direction between the front shaft and the rear shaft from the initial setting distance to raise the wheel from the initial setting height, and a lowering operation including widening the distance in the front-rear direction between the front shaft and the rear shaft from the initial setting distance to lower the wheel from the initial setting height; and
- a return operation (for example, an operation to perform Step S73 to be described later) including setting back the distance in the front-rear direction between the front shaft and the rear shaft to the initial setting distance.

In the vehicle vibration method as described in the first aspect, an initial height setting step includes setting a distance in the front-rear direction between the front shaft and the rear shaft to a predetermined initial setting distance and setting the wheel at a predetermined initial setting height, and a vibration step includes performing vibration by at least one selected from a raising operation step including narrowing the distance in the front-rear direction between the front shaft and the rear shaft from the initial setting distance to raise the wheel from the initial setting height, and a lowering operation step including widening the distance in the front-rear direction between the front shaft and the rear shaft from the initial setting distance to lower the wheel from the initial setting height. As a result, it is possible to vibrate a vehicle while raising and lowering the wheel, thereby making it possible to perform a test simulating the vehicle characteristics on sprung mass on a rough road.

In the vehicle vibration method as described in the second aspect, an initial height setting step includes setting a distance in the front-rear direction between the front shaft and the rear shaft to a predetermined initial setting distance and setting the wheel at a predetermined initial setting height; and a vibration step includes alternately repeating a raising operation step including narrowing the distance in the front-rear direction between the front shaft and the rear shaft from the initial setting distance to raise the wheel from the initial setting height, and a lowering operation step including widening the distance in the front-rear direction between the front shaft and the rear shaft from the initial setting distance to lower the wheel from the initial setting height. As a result, it is possible to vibrate a vehicle while raising and lowering the wheel, thereby making it possible to perform a test simulating the vehicle characteristics on sprung mass on a rough road.

In the vehicle vibration method as described in the third aspect, a front-rear wheel initial height setting step includes setting a distance in the front-rear direction between the front shaft and the rear shaft to a predetermined initial setting distance and setting each of the front wheel and the rear wheel at a predetermined initial setting height; and a vibration step includes alternately repeating a one-wheel raising operation step including narrowing the distance in the front-rear direction between the front shaft and the rear shaft from the initial setting distance to raise one selected from the front wheel and the rear wheel from the initial setting height, and one other-wheel lowering operation step including widening the distance in the front-rear direction between the front shaft and the rear shaft from the initial setting distance to lower one selected from the front wheel and the rear wheel from the initial setting height. As a result, it is possible to vibrate a vehicle while raising and lowering the wheel, thereby making it possible to perform a test simulating the vehicle characteristics on sprung mass on a rough road.

In the vehicle vibration method as described in the fourth aspect, the vibration step is performed while causing the wheel to vibrate back and forth in the up-down direction by causing at least one selected from the front shaft and the rear shaft to move back and forth in the horizontal direction, whereby it is possible to perform a test simulating a virtual traveling state in which a frequency of raising and lowering of a vehicle on a rough road is superimposed by a frequency higher than the frequency thereof.

In the vehicle vibration device as described in the fifth aspect, as operations by the controller, an initial height setting operation includes setting a distance in the front-rear direction between the front shaft and the rear shaft to a predetermined initial setting distance and setting the wheel at a predetermined initial setting height, and a vibration operation includes performing vibration by at least one selected from a raising operation including narrowing the distance in the front-rear direction between the front shaft and the rear shaft from the initial setting distance to raise the wheel from the initial setting height, and a lowering operation including widening the distance in the front-rear direction between the front shaft and the rear shaft from the initial setting distance to lower the wheel from the initial setting height. As a result, it is possible to vibrate a vehicle while raising and lowering the wheel, thereby making it possible to perform a test simulating the vehicle characteristics on sprung mass on a rough road.

DETAILED DESCRIPTION OF THE INVENTION

Figure 1:
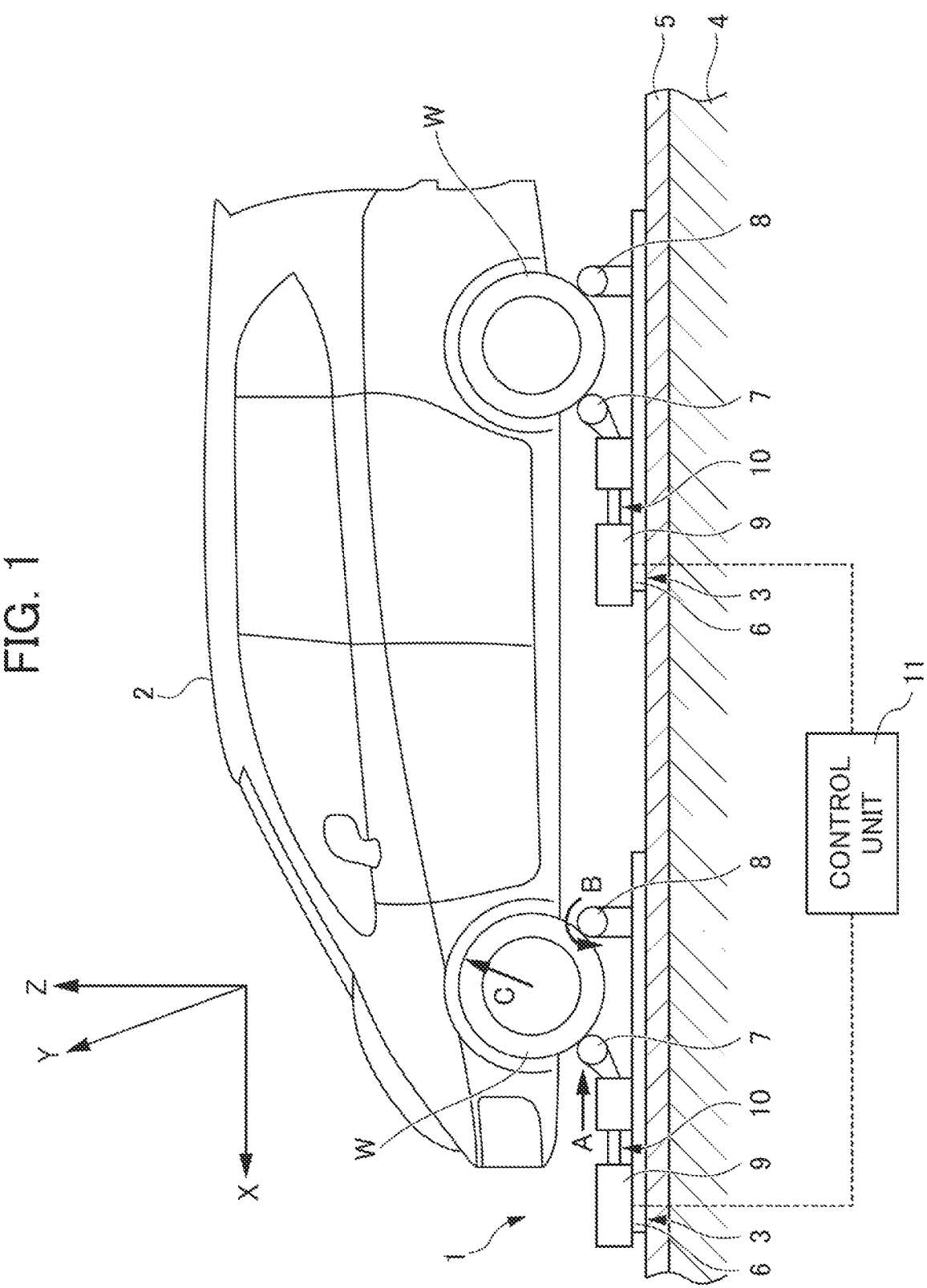
FIG. 1 is a conceptual diagram showing a state in which a vehicle vibration device according to an embodiment of the present invention vibrates a test target vehicle with a vehicle vibration method according to an embodiment of the present invention.
Figure 2:
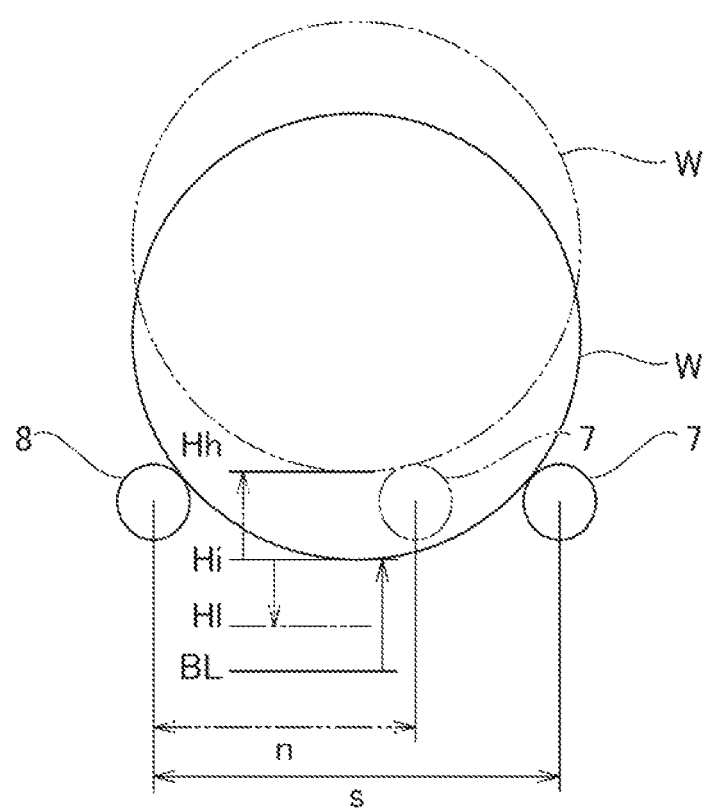
FIG. 2 is a diagram for explaining vibration on one wheel of a test target vehicle with the vehicle vibration method according to an embodiment of the present invention.

Next, embodiments of the present invention will be described with reference to the drawings. In the following drawings, the same or corresponding portions are denoted by the same reference numerals. FIG. 1 is a conceptual diagram showing a state in which a vehicle vibration device according to an embodiment of the present invention vibrates a test target vehicle with a vehicle vibration method according to an embodiment of the present invention. FIG. 2 is a diagram for explaining vibration on one wheel of a test target vehicle with the vehicle vibration method according to an embodiment of the present invention.

A vehicle vibration device 1 for use in a vehicle vibration method according to an embodiment of the present invention may include four vibration tables 3. The four vibration tables 3 may respectively correspond to the four wheels of a vehicle 2. The vehicle 2 may be a test target vehicle. Each of the four vibration tables 3 may have a similar configuration. The four vibration tables 3 may be each provided at a position corresponding to each of four wheels W of the vehicle 2 on a plate-shaped base 5. The plate-shaped base 5 may be horizontally fastened to a horizontal floor 4 of a rigid structure, such as a test building. As shown in FIG. 1, in a test using the vehicle vibration device 1, when the vehicle 2 is set at a regular position, the front-rear direction (vehicle length direction) of the vehicle 2 is defined as the X-axis, the left-right direction (vehicle width direction) is defined as the Y-axis, and the up-down direction (vertical direction) is defined as the Z-axis. In the following description, each of the front-rear, left-right, and up-down directions has the meaning described above, unless otherwise specified.

The vibration tables 3 may be provided on movable base plates 6 placed on the base 5. More specifically, the vibration tables 3 may be configured by moving structures 10 each including an actuator 9 being provided on the movable base plates 6, and the actuator 9 causes the front shaft 7 to move back and forth in the horizontal direction, among the front shaft 7 and the rear shaft 8 which extend in the left-right direction and are spaced apart from each other to sandwich a corresponding wheel W of the vehicle 2 in the front-rear direction. The vibration tables 3 may each correspond to one of the four wheels W of the vehicle 2. Therefore, a total of four vibration tables 3 may be provided. Therefore, a total of four moving structures 10 may be also provided to respectively correspond to the four wheels W.

As shown in FIG. 1, on the vibration table 3 of the vehicle vibration device 1, the wheels W may be each sandwiched in the front-rear direction by the front shaft 7 and the rear shaft 8. Then, the driving force indicated by the arrow A generated by the actuator 9 of the moving structure 10 may cause the front shaft 7 to move in the horizontal direction such that the rear shaft 8 may rotate as shown by the arrow B, a result of which the wheel W may be displaced upward obliquely in the front-rear direction as shown by the arrow C. By reciprocating the drive by the actuator 9, it is possible to vibrate the wheel W in the front-rear direction and the up-down direction.

The moving structures 10 provided to correspond to each of the four wheels W may be operated under control by a control unit 11. That is, by a hydraulic circuit provided to each of the actuators 9 of each moving structure 10 being operated under the control of the control unit 11, it is possible to operate each moving structure 10 in conjunction with each other.

With reference to FIG. 2, for one wheel W of the test target vehicle, the moving structure 10 may cause the front shaft 7 to move in the front-rear direction and the horizontal direction with respect to the rear shaft 8 which is fixed in the vehicle vibration device 1, whereby the distance between the front shaft 7 and the rear shaft 8 may be changed such that the wheel W may move upward or downward in response to this change. Hereinafter, the distance between the front shaft 7 and the rear shaft 8 may be abbreviated as "shaft distance d" as necessary.

In FIG. 2, the position of the wheel W may be defined by a length from the upper surface BL of the base 5 to the lower end of the wheel W. When the shaft distance d is set to a predetermined initial setting distance s, the wheel W may be set to a predetermined initial setting height Hi (denoted by a solid line). When the front shaft 7 is caused to move to approach the rear shaft 8 from the initial setting distance s so that the shaft distance d is narrower than the initial setting distance s, the wheel W may go upward from the initial setting height Hi. As denoted by the two-dot chain line in FIG. 2, when the front shaft 7 is caused to move toward a position just below the axle of the wheel W so that the shaft distance d is narrowed to n, the wheel W may go upward to the position Hh. Furthermore, by widening the shaft distance d from the initial setting distance s, it is possible to move the wheel W to the position Hl which is lower than the initial setting height Hi.

Figure 3:
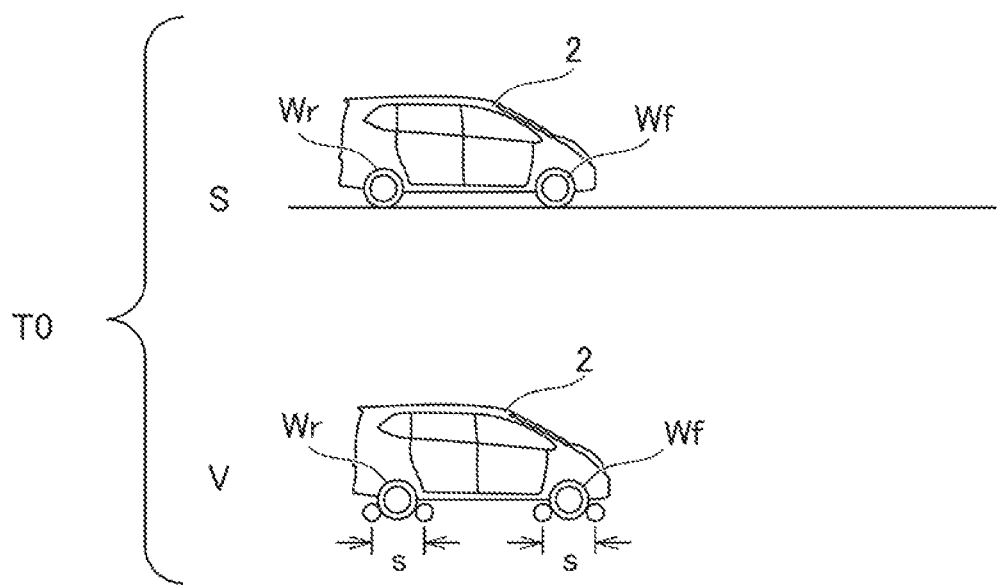
FIG. 3 is a diagram for explaining a state in which wheels of a test target vehicle are set at an initial setting height with the vehicle vibration method according to an embodiment of the present invention.

FIG. 3 is a diagram for explaining a state in which the wheels of the vehicle 2 as a test target vehicle are established at an initial setting height. In FIG. 3, the posture and position of the vehicle 2 on the road surface at a certain point in time in the time interval T0 are denoted as "S". Then, the state of simulating this posture and position on the vehicle vibration device 1 is denoted as "V". These are shown in contrast in FIG. 3. In FIG. 3, the posture and position "S" of the vehicle 2 may be horizontal. Furthermore, the lower ends of the front wheel Wf and the rear wheel Wr may be located at the lower limit of the valleys of "rough road" in the vibrating test. On the vehicle vibration device 1, for each of the front wheel Wf and rear wheel Wr of the vehicle 2, the shaft distance d may be set to the initial setting distance s. Using this setting, the posture and position of the vehicle 2 may be set to an initial setting state.

Figure 4:
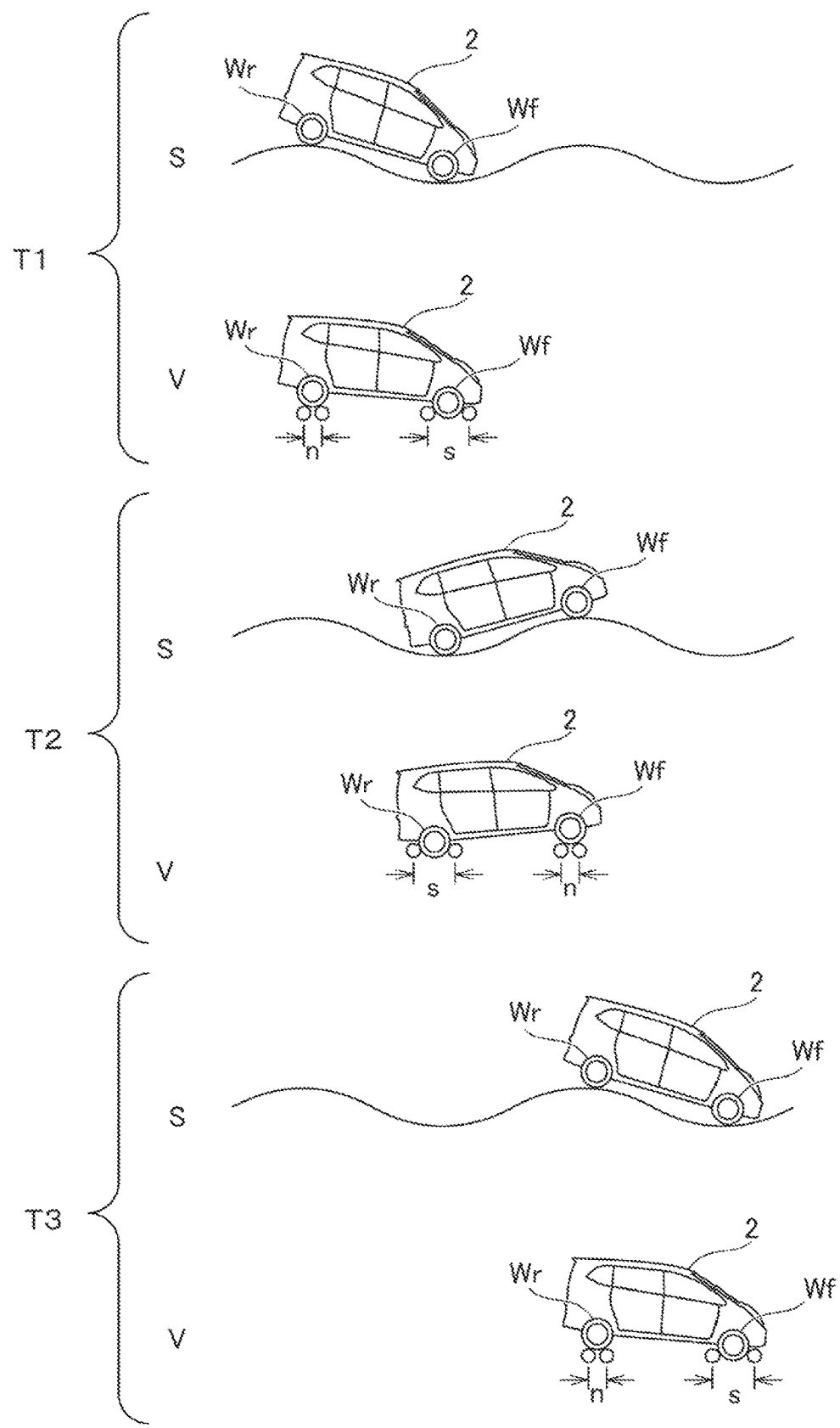
FIG. 4 is a diagram for illustrating simulations in which a test target vehicle travels on a rough road with the vehicle vibration method according to an embodiment of the present invention.

FIG. 4 is a diagram for explaining a state simulating a test target vehicle travels on a rough road with the vehicle vibration method according to an embodiment of the present invention. In FIG. 4, T1, T2, and T3 each indicate a time-series time interval in the order described above. In FIG. 4, the posture and posture of the vehicle 2 on the road surface at a certain point in time for each of these time intervals are denoted as "S". Furthermore, the state of simulating this posture and position on the vehicle vibration device 1 is denoted as "V". In FIG. 4, "S" and "V" are shown as contrasting above and below. Details of the sequence in the vehicle vibration method will be described later.

Figure 5:
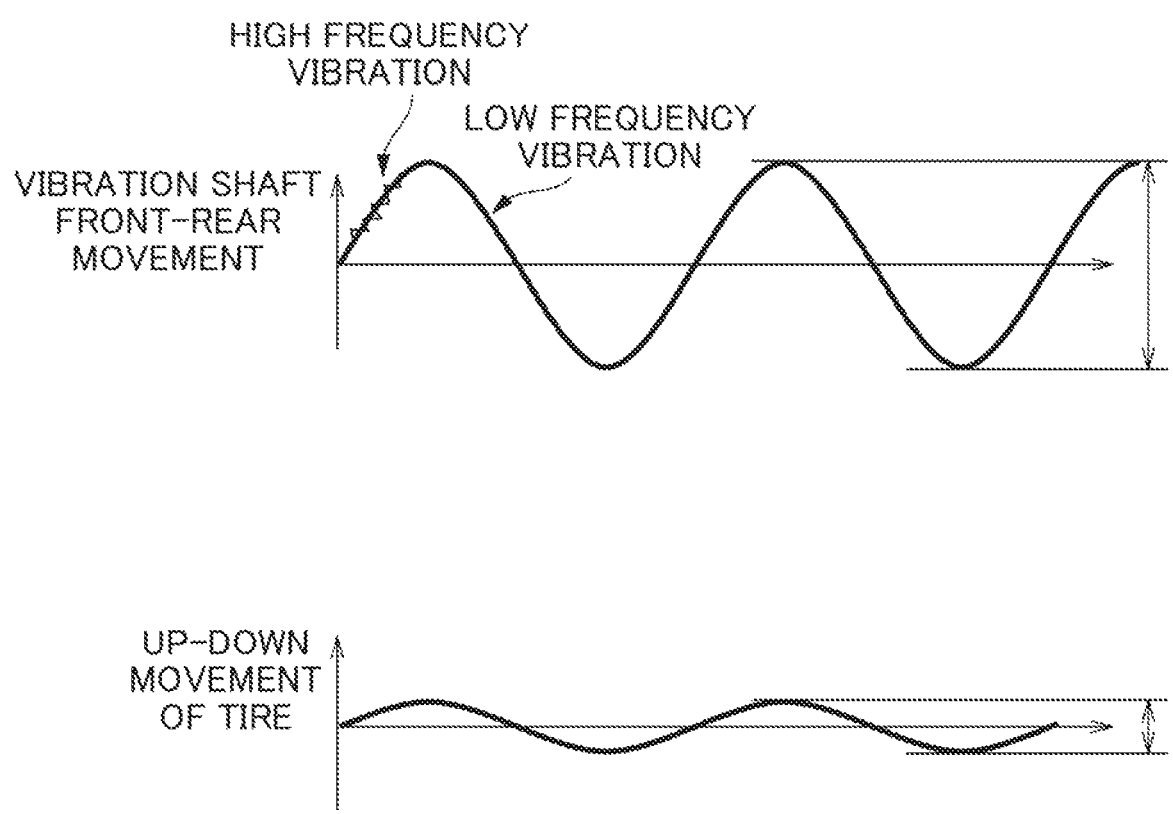
FIG. 5 is a diagram for explaining a state of performing vibration in which different frequencies are superimposed on one wheel of a test target vehicle with the vehicle vibration method according to an embodiment of the present invention.

FIG. 5 is a diagram for explaining a state of performing vibration in which different frequencies are superimposed on one wheel of a test target vehicle with the vehicle vibration method according to an embodiment of the present invention. That is, the upper diagram in FIG. 5 represents the change in the shaft distance d as the front-rear movement of the front shaft 7 on the time axis. The change in the shaft distance d is described as "vibration shaft front-rear movement". In this example, the vibration displacement of high frequency is superimposed on the vibration displacement of the sinusoidal low frequency. The lower diagram in FIG. 5 represents the up-down movement of the wheel W on the same time axis as the diagram of the upper diagram. The up-down movement of the wheel W is described as "up-down movement of tire". Regarding "up-down movement of tire", minute vibrations corresponding to high frequency components in "vibration shaft front-rear movement" are expressed by a sinusoidal curve connecting the center positions of minute vibrations. However, the actual "up-down movement of tire" shows a sinusoidal form accompanied with minute vibrations corresponding to the high frequency component in the upper diagram of FIG. 5. That is, it is possible to perform vibration simulating a rough road accompanied with minute vibration.

Figure 6:
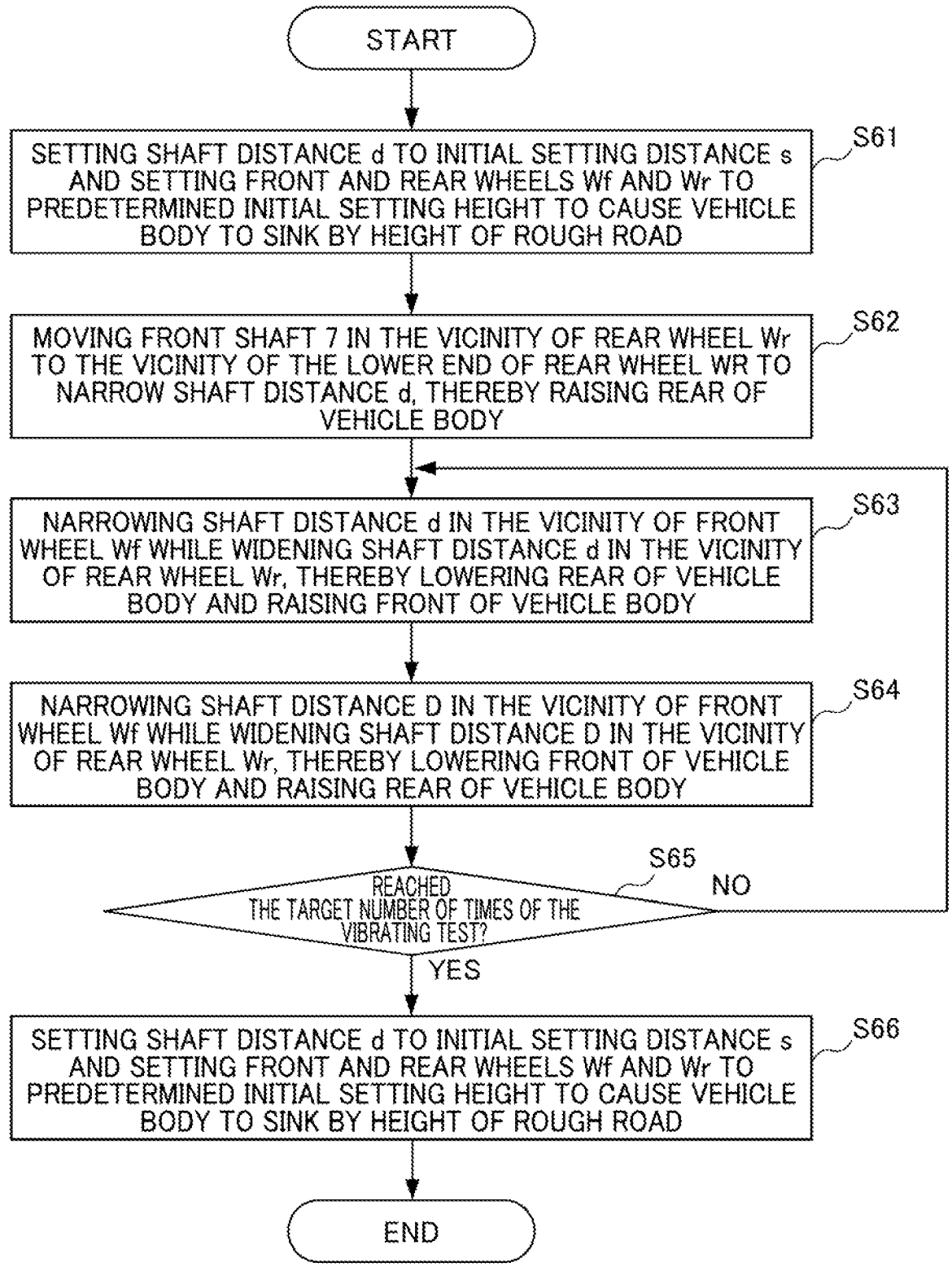
FIG. 6 is a flow chart of a process for simulating the traveling condition on a rough road with the vehicle vibration method according to an embodiment of the present invention.

Next, with reference to FIG. 6 along with FIGS. 3 and 4, a description is given of a sequence for simulating the traveling condition on a rough road with the vehicle vibration method according to an embodiment of the present invention. As preparation work, first, the vehicle 2 as a test target vehicle may be placed on the vehicle vibration device 1. The front wheel Wf and the rear wheel Wr may be respectively disposed between the front shaft 7 and the rear shaft 8 on the corresponding vibration tables 3. As a first step for vibration, the shaft distance d may be set to the initial setting value s for each of the front wheel Wf and the rear wheel Wr. In this manner, the front wheel Wf and the rear wheel Wr may be set at the initial setting height. Thus, the vehicle body may be caused to sink by the height (amplitude) corresponding to the roughness on a rough road (step S61). This state corresponds to the state of FIG. 3.

Then, at a certain point in time of the time interval T1 in FIG. 4, the rear wheel Wr may be located at the peak of the roughness and the front wheel Wf may be located at the valley of the roughness on the rough road. As a result, in the vehicle 2, the rear of the vehicle body may be positioned relatively high. To simulate this state on the vehicle vibration device 1, the shaft distance d of the rear wheel Wr may be narrowed to n to raise the rear of the vehicle body (Step S62).

Toward a certain point in time during the time interval T2 following the time interval T1 of FIG. 4, the rear wheel Wr may go down toward the valley of the roughness and the front wheel Wf may go up toward the peak of the roughness. As a result, the rear of the vehicle body of the vehicle 2 may gradually go down and the front thereof may gradually go up. To simulate this state on the vehicle vibration device 1, the shaft distance d of the front wheel Wf may be gradually narrowed to n while the shaft distance d of the rear wheel Wr may be gradually widened to s. Thus, the rear of the vehicle body may be caused to go down while the front of the vehicle body may be caused to go up (Step S63).

Toward a certain point in time during the time interval T3 following the time interval T2 of FIG. 4, the front wheel Wf may go down toward the valley of the roughness and the rear wheel Wr may go up toward the peak of the roughness. As a result, the front of the vehicle body of the vehicle 2 may gradually go down and the rear thereof may gradually go up. To simulate this state on the vehicle vibration device 1, the shaft distance d of the rear wheel Wr may be gradually narrowed to n while the shaft distance d of the front wheel Wf may be gradually widened to s. Thus, the front of the vehicle body may be caused to go down while the rear of the vehicle body may be caused to go up (Step S64).

According to the procedure in the above-described steps S63 and S64, the front and rear wheels Wf and Wr of the vehicle 2 may respectively go up and down by the amplitude equivalent to the valley of the rough road. While the number of times of going up and down has not reached the target number of times of the vibrating test (Step S65: NO), Step S63 and Step S64 may be repeated. When the number of times of going up and down reaches the target number of times (Step S65: YES), the position and the posture of the vehicle 2 may be returned to the initial state (Step S66) in the same manner as in Step S61, and the vibrating test may end.

Next, with reference to FIGS. 7 to 9, a plurality of states in the vehicle vibration method according to an embodiment of the present invention will be described.

Figure 7:
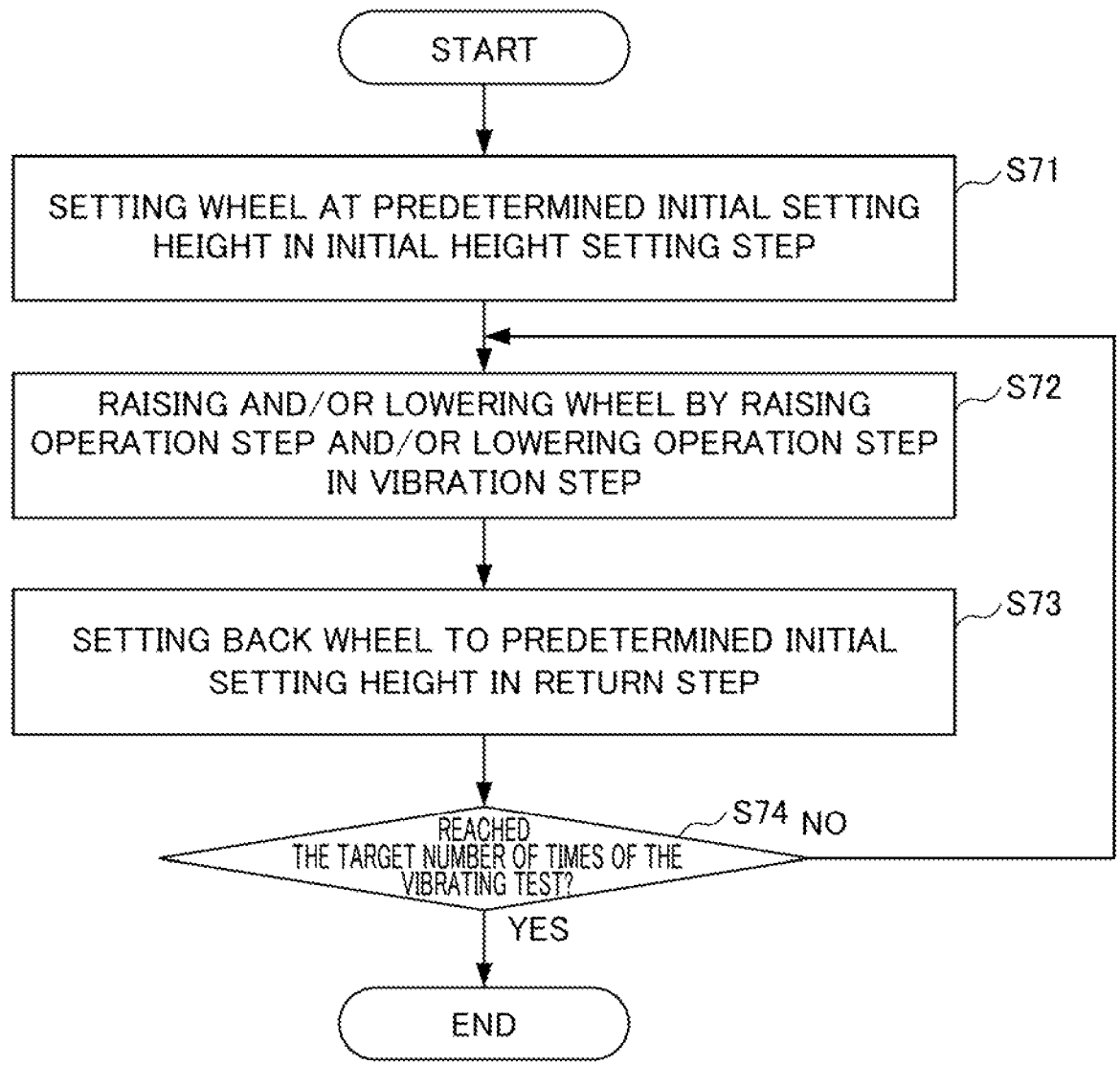
FIG. 7 is a flowchart of a sequence in one aspect of the vehicle vibration method according to an embodiment of the present invention.

FIG. 7 is a flowchart of a process in one embodiment of the vehicle vibration method according to an embodiment of the present invention. According to the vehicle vibration method of FIG. 7, first, the initial height setting step may include setting the distance d in the front-rear direction between the front shaft 7 and the rear shaft 8 in the vehicle vibration device 1 of FIG. 1 to a predetermined initial setting distance s and setting the wheel W at a predetermined initial setting height (Step S71).

Furthermore, the vibration step may include performing a raising operation step and/or a lowering operation step. This may cause the wheel W to go up and/or down (Step S72). Here, the raising operation step may refer to a step of narrowing the distance d in the front-rear direction between the front shaft 7 and the rear shaft 8 than the initial setting distance s, and a step of raising the wheel W from the initial setting height. Furthermore, the lowering operation step may refer to widening the distance d in the front-rear direction between the front shaft 7 and the rear shaft 8 than the initial setting distance s, and a step of lowering the wheel W from the initial setting height.

Next, a return step may be performed. The return step may include setting the distance d in the front-rear direction between the front shaft 7 and the rear shaft 8 back to the initial setting distance s (Step S73).

After the return step of Step S73, while the number of raising and/or lowering the wheel W has not reached the target number of times of vibrating for the vibrating test (Step S74: NO), Step S72 and Step S73 may be repeated to sustain the vibration. When the number of times of raising and/or lowering the wheel W reaches the target number of times of vibrating for the vibrating test (Step S74: YES), the vibrating test may end.

Raising and lowering the wheel W in Step S72 and Step S73 may be performed in a sine wave manner on the time axis, whereby it is possible to perform vibration simulating a rough road of the sine wave. Furthermore, the front shaft 7, which is a vibration shaft, as shown in FIG. 5, may be operated not in a sine wave manner but rather a distorted waveform, whereby it is possible to perform vibration simulating a rough road of the distorted waveform.

Figure 8:
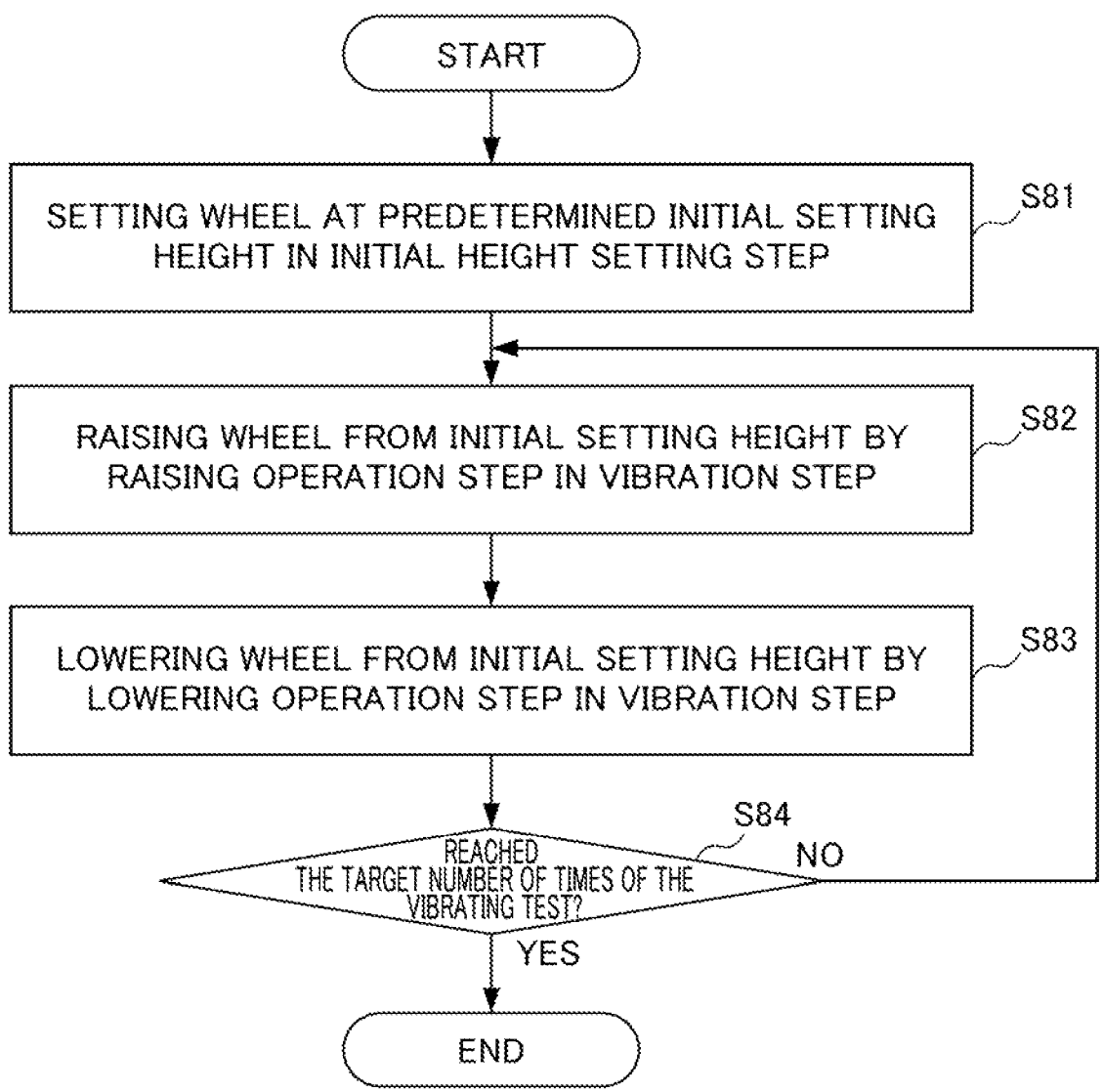
FIG. 8 is a flowchart of a sequence in another aspect of the vehicle vibration method according to an embodiment of the present invention.

FIG. 8 is a flowchart of a sequence in another aspect of the vehicle vibration method according to an embodiment of the present invention. According to the vehicle vibration method of FIG. 8, first, the initial height setting step may include setting the distance d in the front-rear direction between the front shaft 7 and the rear shaft 8 in the vibration device 1 of FIG. 1 to a predetermined initial setting distance s and setting the wheel W at a predetermined initial setting height (Step S81).

Next, the vibration step may include performing the raising operation step (Step S82). The raising operation step may include narrowing the distance d in the front-rear direction between the front shaft 7 and the rear shaft 8 than the initial setting distance s, and raising the wheel W from the initial setting height.

Next, the vibration step may include performing the lowering operation step (Step S83). The lowering operation step may include widening the distance d in the front-rear direction between the front shaft 7 and the rear shaft 8 than the initial setting distance n and lowering the wheel from the initial setting height.

After the lowering operation step of Step S83, while the number of raising and/or lowering the wheel W has not reached the target number of times of vibrating for the vibrating test (Step S84: NO), Step S82 and Step S83 may be repeated to sustain the vibration. When the number of times of raising and/or lowering the wheel W reaches the target number of times of vibrating for the vibrating test (Step S84: YES), the vibrating test may end.

Raising and lowering the wheel. W in Step S82 and Step S83 may be performed in a manner according to a sine wave on the time axis, whereby it is possible to perform vibration simulating a rough road of the sine wave. Furthermore, the front shaft 7, which is a vibration shaft, as shown in FIG. 5, may be operated not in a sine wave manner but rather a distorted waveform, whereby it is possible to perform vibrating simulating a rough road of the distorted waveform.

Figure 9:
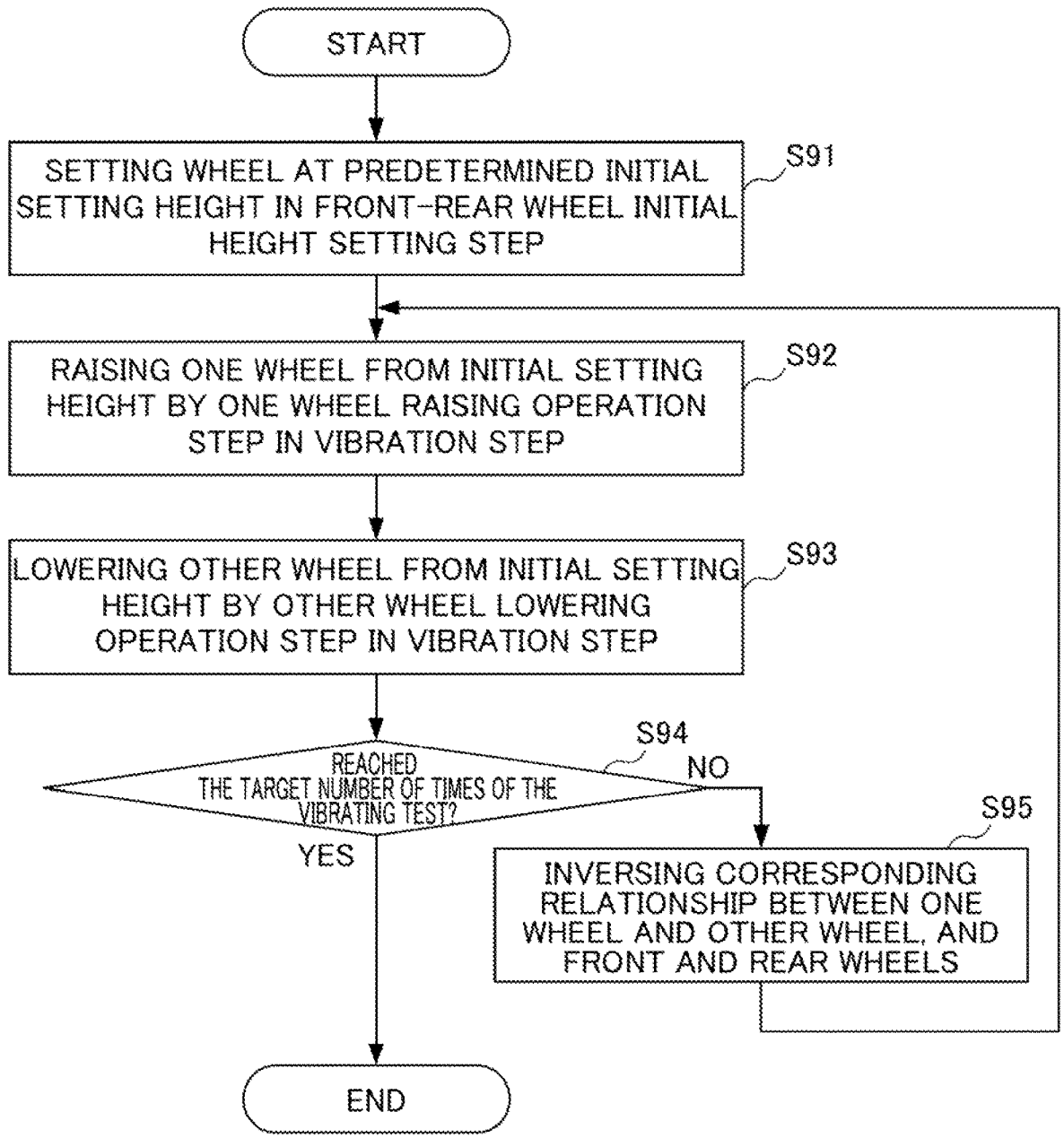
FIG. 9 is a flowchart of a sequence in yet another aspect of the vehicle vibration method according to an embodiment of the present invention.

FIG. 9 is a flowchart of a sequence in yet another aspect of the vehicle vibration method according to an embodiment of the present invention. According to the vehicle vibration method of FIG. 9, first, the initial height setting step may include setting the distance d in the front-rear direction between the front shaft 7 and the rear shaft 8 in the vibration device 1 of FIG. 1 to a predetermined initial setting distance s and setting the wheel W at a predetermined initial setting height (Step S91).

Next, the vibration step may include performing a one-wheel raising operation step (Step S92). The one-wheel raising operation step may include narrowing the distance d in the front-rear direction between the front shaft 7 and the rear shaft 8 from the initial setting distance s, thereby raising either the front wheel Wf or the rear wheel Wr from the initial setting height.

Next, the vibration step may include performing one other-wheel lowering operation step (Step S93). The other-wheel lowering operation step may include widening the distance d in the front-rear direction between the front shaft 7 and the rear shaft 8 from the initial setting distance n, thereby lowering the other wheel selected from the front wheel Wf and the rear wheel Wr from the initial setting height.

After the other-wheel lowering operation step of Step S93, while the number of raising and/or lowering the wheel W has not reached the target number of times of vibrating for the vibrating test (Step S94: NO), the corresponding relationship between the one wheel and the other wheel, and the front wheel Wf and the rear wheel Wr may be inversed (Step S95), and Step S92 and Step S93 may be alternately repeated to sustain the vibration. When the number of times of raising and/or lowering the wheel W reaches the target number of times of vibrating for the vibrating test (Step S94: YES), the vibrating test may end.

Alternately repeating the raising and lowering of the wheel W in Step S92 and Step S93 while inversing the corresponding relationship between the one wheel and the other wheel, and the front wheel Wf and the rear wheel Wr may be performed in a sine wave manner on the time axis, whereby it is possible to perform vibration simulating a rough road of the sine wave. Furthermore, the front shaft 7, which is a vibration shaft, as shown in FIG. 5, may be operated not in a sine wave manner but rather a distorted waveform, whereby it is possible to perform vibration simulating a rough road of the distorted waveform.

As described above, the procedure described with reference to FIGS. 6 to 9 may be performed in the vehicle vibration device 1, which is an embodiment of the present invention, such that the control unit 11 controls the moving structures 10 each including the actuator 9 that causes the front shaft 7 to move in the front-rear direction and the horizontal direction.

According to the vehicle vibration method of the present embodiment, the following advantageous effects are obtained.

In the vehicle vibration method according to the first aspect, the initial height setting step (Step S71) includes setting the shaft distance d which is a distance in the front-rear direction between the front shaft 7 and the rear shaft 8 in the vehicle vibration device 1 to a predetermined initial setting distance s and setting the wheel at a predetermined initial setting height Hi, and the vibration step (Step S72) includes performing vibration by at least one selected from the raising operation step including narrowing the distance in the front-rear direction between the front shaft and the rear shaft from the initial setting distance and raising the wheel from the initial setting height, and the lowering operation step including widening the distance in the front-rear direction between the front shaft and the rear shaft from the initial setting distance and lowering the wheel from the initial setting height. As a result, it is possible to vibrate a vehicle while raising and lowering the wheel, thereby making it possible to perform a test simulating the vehicle characteristics on sprung mass on a rough road.

In the vehicle vibration method according to the second aspect, the initial height setting step (Step S81) includes setting the shaft distance d in the vehicle vibration device 1 to a predetermined initial setting distance s and setting the wheel at a predetermined initial setting height Hi, and the vibration step (Step 384: NO→Step S82→Step S83) includes alternately repeating the raising operation step (Step S82) including narrowing the shaft distance d from the initial setting distance s thereby raising the wheel from the initial setting height Hi, and the lowering operation step (Step S83) including widening the shaft distance d than the initial setting distance s thereby lowering the wheel from the initial setting height Hi. As a result, it is possible to vibrate a vehicle while raising and lowering the wheel, thereby making it possible to perform a test simulating the vehicle characteristics on sprung mass on a rough road.

In the vehicle vibration method according to the third aspect, the front-rear wheel initial height setting step (Step S91) includes setting the shaft distance d in the vehicle vibration device 1 to a predetermined initial setting distance s and setting the front wheel Wf and the rear wheel Wr at a predetermined initial setting height Hi, and the vibration step (Step S94: NO→Step S95→Step S92→Step S93) includes alternately repeating the one-wheel raising operation step (Step S92) including narrowing the shaft distance d than the initial setting distance s and raising one selected from the front wheel Wf and the rear wheel Wr from the initial setting height, and the one other-wheel lowering operation step (Step S93) including widening the shaft distance d than the initial setting distance s and lowering one selected from the front wheel Wf and the rear wheel Wr from the initial setting height. As a result, it is possible to vibrate a vehicle while raising and lowering the wheels, thereby making it possible to perform a test simulating the vehicle characteristics on sprung mass on a rough road.

In the vehicle vibration method according to the fourth aspect, the vibration step is performed while causing the wheel to vibrate in the front-rear direction and the up-down direction by causing at least one selected from the front shaft 7 and the rear shaft 8 in the vehicle vibration device 1 to move in the front-rear direction and the horizontal direction, whereby it is possible to perform a test simulating a virtual traveling state in which a frequency of raising and lowering of a vehicle on a rough road is superimposed by a frequency higher than the this frequency.

In the vehicle vibration device 1 according to the fifth aspect, as operations by the control unit 11, the initial height setting operation includes setting a distance d in the front-rear direction between the front shaft 7 and the rear shaft 8 to a predetermined initial setting distance s and setting the wheel at a predetermined initial setting height Hi, and the vibration operation includes performing vibration by at least one selected from a raising operation including narrowing the distance d from the initial setting distance s and raising the wheel from the initial setting height Hi, and a lowering operation including widening the distance d than the initial setting distance s and lowering the wheel from the initial setting height Hi. As a result, it is possible to vibrate a vehicle while raising and lowering the wheel, thereby making it possible to perform a test simulating the vehicle characteristics on sprung mass on a rough road.

While embodiments of the present invention have been described above, the present invention is not limited thereto. Detailed parts may be modified as appropriate within the spirit of the present invention. For example, in the above description, the initial setting height is such that the lowest position of the wheel corresponds to the lower limit of the valley of rough road. However, in the present application, the lowest position of the wheel may be set to a height midway between the peak and the valley of the rough road instead. Furthermore, the vibration simulating a rough road may be performed so as to have the same phase or the opposite phases with respect to both the left and right wheels. Furthermore, the front shaft is caused to move back and forth horizontally in the above description. However, the present invention is not limited thereto, and the rear shaft may be caused to move back and forth horizontally. In addition, in the present invention, the front shaft is not strictly limited to moving horizontally, and the front shaft or the rear shaft as the vibration shaft may be moved by tilting several degrees. In such a case, causing the vibration shaft to be brought into contact with a tire from obliquely downward makes it possible to support the load of the tire, such that it is possible to efficiently transmit the vibration by the vibration shaft to the tire.

EXPLANATION OF REFERENCE NUMERALS

W . . . Wheel
Wf . . . Front wheel
Wr . . . Rear wheel
1 . . . Vehicle vibration device
2 . . . Vehicle
3 . . . Vibration table
4 . . . Floor
5 . . . Base
6 . . . Movable base plate
7 . . . Front shaft
8 . . . Rear Shaft
9 . . . Actuator
10 . . . Moving structure
11 . . . Control unit

What is claimed is:

1. A vehicle vibration method with a vibration device that causes at least one wheel of a test target vehicle to vibrate in a front-rear direction and an up-down direction by sandwiching the wheel by a front shaft and a rear shaft extending in a left-right direction and causing at least one selected from the front shaft and the rear shaft to move back and forth in a horizontal direction, the method comprising:
an initial height setting step including setting a distance in the front-rear direction between the front shaft and the rear shaft to a predetermined initial setting distance and setting the wheel at a predetermined initial setting height;
a vibration step including performing vibration such that a tilt angle of the test target vehicle changes to simulate driving on a rough road by at least one selected from a raising operation step including narrowing the distance in the front-rear direction between the front shaft and the rear shaft from the initial setting distance to raise the wheel from the initial setting height, and a lowering operation step including widening the distance in the front-rear direction between the front shaft and the rear shaft from the initial setting distance to lower the wheel from the initial setting height; and
a return step including setting back the distance in the front-rear direction between the front shaft and the rear shaft to the initial setting distance.

2. The vehicle vibration method according to claim 1, wherein the vibration step is performed while causing the vibration such that the tilt angle of the test target vehicle changes by causing at least one selected from the front shaft and the rear shaft to move back and forth in the horizontal direction.

3. A vehicle vibration method with a vibration device that causes at least one wheel of a test target vehicle to vibrate back and forth in an up-down direction by sandwiching the wheel by a front shaft and a rear shaft extending in a left-right direction and causing at least one selected from the front shaft and the rear shaft to move back and forth in a horizontal direction, the method comprising:
- an initial height setting step including setting a distance in the front-rear direction between the front shaft and the rear shaft to a predetermined initial setting distance and setting the wheel at a predetermined initial setting height; and
- a vibration step including alternately repeating a raising operation step including narrowing the distance in the front-rear direction between the front shaft and the rear shaft from the initial setting distance to raise the wheel from the initial setting height, and a lowering operation step including widening the distance in the front-rear direction between the front shaft and the rear shaft than the initial setting distance to lower the wheel from the initial setting height.

4. A vehicle vibration method with a vibration device that causes each of a front wheel and a rear wheel of a test target vehicle to vibrate back and forth in an up-down direction by sandwiching each of the front wheel and the rear wheel by a front shaft and a rear shaft extending in a left-right direction and causing at least one selected from the front shaft and the rear shaft to move back and forth in a horizontal direction, the method comprising:
- a front-rear wheel initial height setting step including setting a distance in the front-rear direction between the front shaft and the rear shaft to a predetermined initial setting distance and setting each of the front wheel and the rear wheel at a predetermined initial setting height; and
- a vibration step including alternately repeating a one-wheel raising operation step including narrowing the distance in the front-rear direction between the front shaft and the rear shaft from the initial setting distance to raise one selected from the front wheel and the rear wheel from the initial setting height, and one other-wheel lowering operation step including widening the distance in the front-rear direction between the front shaft and the rear shaft from the initial setting distance to lower one selected from the front wheel and the rear wheel from the initial setting height.

5. A vehicle vibration device that causes each wheel of a test target vehicle to vibrate in a front-rear direction and an up-down direction by sandwiching each of the wheels by a front shaft and a rear shaft extending in a left-right direction and causing the front shaft to move in the front-rear direction and a horizontal direction,
- the vehicle vibration device comprising a moving structure including an actuator that causes the front shaft to move in the front-rear direction and the horizontal direction, the moving structure being configured to operate under control of a predetermined controller and cause the front shaft to move,
- wherein the controller is configured to cause the moving structure to perform:
- an initial height setting operation including setting a distance in the front-rear direction between the front shaft and the rear shaft to a predetermined initial setting distance and setting the wheel at a predetermined initial setting height;
- a vibration operation including performing vibration such that a tilt angle of the test target vehicle changes to simulate driving on a rough road by at least one selected from a raising operation including narrowing the distance in the front-rear direction between the front shaft and the rear shaft from the initial setting distance to raise the wheel from the initial setting height, and a lowering operation including widening the distance in the front-rear direction between the front shaft and the rear shaft from the initial setting distance to lower the wheel from the initial setting height; and
- a return operation including setting back the distance in the front-rear direction between the front shaft and the rear shaft to the initial setting distance.

\* \* \* \* \*